United States Patent [19] [11] 4,218,372
Koerte [45] Aug. 19, 1980

[54] AZO COMPOUNDS HAVING A β-ALKYNYLOXY CARBONYLALKYL GROUP ON THE COUPLING COMPONENT RADICAL

[75] Inventor: Klaus Koerte, Ettingen, Switzerland

[73] Assignee: Sandoz Ltd., Basel, Switzerland

[21] Appl. No.: 853,531

[22] Filed: Nov. 21, 1977

[30] Foreign Application Priority Data

Aug. 12, 1977 [CH] Switzerland ............... 9907/77

[51] Int. Cl.$^2$ ........................................... C09B 29/36
[52] U.S. Cl. .................................. 260/196; 260/152; 260/158; 260/162; 260/163; 260/187; 260/207; 260/207.1
[58] Field of Search ............... 260/196, 207, 207.1, 260/187, 162, 163, 152, 158

[56] References Cited

U.S. PATENT DOCUMENTS

| 2,373,700 | 4/1945 | McNally et al. ............ 260/196 X |
| 3,097,198 | 7/1963 | Fishwick et al. .......... 260/207 X |
| 3,522,235 | 7/1970 | Baron et al. ............... 260/207 |
| 3,544,550 | 12/1970 | Anderton et al. .......... 260/207 X |
| 3,553,190 | 1/1971 | Anderton et al. .......... 260/207 |
| 3,817,977 | 6/1974 | Groebke .................... 260/196 |
| 3,860,572 | 1/1975 | Peter et al. ............... 260/207 |
| 3,971,741 | 7/1976 | Dehmel et al. ............ 260/207.1 X |
| 4,039,529 | 8/1977 | Angliker et al. .......... 260/207 X |

FOREIGN PATENT DOCUMENTS

| 2514530 | 10/1975 | Fed. Rep. of Germany ..... 260/207 |
| 928492 | 6/1963 | United Kingdom ........... 260/207.1 |
| 959260 | 5/1964 | United Kingdom ........... 260/207 |
| 1313371 | 4/1973 | United Kingdom ........... 260/207 |
| 1321902 | 7/1973 | United Kingdom ........... 260/207 |
| 1479469 | 7/1977 | United Kingdom ........... 260/207 |

*Primary Examiner*—Arthur P. Demers
*Attorney, Agent, or Firm*—Gerald D. Sharkin; Richard E. Vila; Melvyn M. Kassenoff

[57] ABSTRACT

Compounds of the formula, $$D-N=N-K-N\begin{matrix}R_1\\ \\R_2-CO-O-C(U_1U_2)-C\equiv C-U_3,\end{matrix}$$

in which
D is a diazo component radical of the benzene, pyrazole, thiophene, thiazole, isothiazole or thiadiazole series,
K is 1,4-phenylene, substituted 1,4-phenylene or 1,4-naphthylene,
$R_1$, in the case where K is 1,4-naphthylene, is hydrogen or ($C_{1-4}$)-alkyl or, in the case where K is 1,4-phenylene or substituted 1,4-phenylene, $R_1$ is hydrogen, ($C_{1-4}$)alkyl, ($C_{1-4}$)alkyl monosubstituted by chlorine, bromine, vinylsulphonyl, hydroxy, cyano, ($C_{1-2}$)alkoxy, phenyl, acetyl, phenoxy, formyloxy, alkyl($C_{1-3}$)carbonyloxy, benzoyloxy, alkoxy($C_{1-2}$)carbonyl, alkoxy($C_{1-2}$)carbonyloxy, ($C_{1-2}$)alkylaminocarbonyl, di($C_{1-2}$)alkylaminocarbonyl or —CO—O—C($U_1U_2$)—C≡C—$U_3$; ($C_{3-4}$)alkyl substituted by hydroxy and one further substituent selected from the group consisting of chlorine, ($C_{1-4}$) alkoxy, hydroxy, phenoxy and benzyloxy; ($C_{2-4}$)alkenyl; chloro($C_{3-4}$)alkenyl or bromo($C_{3-4}$)alkenyl,
$R_2$ is straight chain or branched chain ($C_{1-4}$)alkylene or —CH$_2$CH$_2$—O—CH$_2$CH$_2$—,
either, each of $U_1$ and $U_2$, independently, is hydrogen or ($C_{1-4}$)alkyl, and
$U_3$ is hydrogen or $$-C(U_1U_2)-O-U_4$$

or $U_1$ and $U_2$ together with the carbon atom to which they are bound form a cyclohexyl ring, and
$U_3$ is hydrogen,
wherein $U_4$ is hydrogen, ($C_{1-4}$)alkyl or alkyl($C_{1-4}$)carbonyl, which compounds are useful as disperse dyes for dyeing and printing textile substrates comprising synthetic or semi-synthetic high molecular weight, hydrophobic organic materials such as linear, aromatic polyesters, cellulose 2½ acetate, cellulose triacetate and synthetic polyamides. The obtained dyeings possess notable fastness to light, thermofixation, sublimation, pressing and wet treatments.

15 Claims, No Drawings

AZO COMPOUNDS HAVING A β-ALKYNYLOXY CARBONYLALKYL GROUP ON THE COUPLING COMPONENT RADICAL

The present invention relates to azo compounds, their production and use as disperse dyes.

Accordingly, the present invention provides compounds of formula I

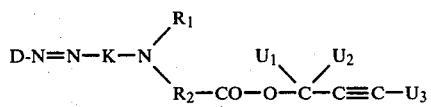

in which

D is a diazo component radical of the benzene, pyrazole, thiophene, thiazole, isothiazole or thiadiazole series, K is 1,4-phenylene, substituted 1,4-phenylene or 1,4-naphthylene, $R_1$, in the case where K is 1,4-naphthylene, is hydrogen or $(C_{1-4})$alkyl or, in the case where K is 1,4-phenylene or substituted 1,4-phenylene, $R_1$ is hydrogen; $(C_{1-4})$alkyl; $(C_{1-4})$alkyl monosubstituted by chlorine, bromine, vinylsulphonyl, hydroxy, cyano, $(C_{1-2})$alkoxy, phenyl, acetyl, phenoxy, formyloxy, alkyl$(C_{1-3})$carbonyloxy, benzoyloxy, alkoxy$(C_{1-2})$carbonyl, alkyl$(C_{1-2})$carbonyloxy, $(C_{1-2})$alkylaminocarbonyl, di$(C_{1-2})$alkylaminocarbonyl or $-CO-O-C(U_1U_2)-C\equiv C-U_3$; $(C_{3-4})$alkyl substituted by hydroxy and one further substituent selected from the group consisting of chlorine, $(C_{1-4})$alkoxy, hydroxy, phenoxy and benzyloxy; $(C_{2-4})$alkenyl; chloro$(C_{3-4})$alkenyl or bromo$(C_{3-4})$alkenyl, $R_2$ is straight chain or branched chain $(C_{1-4})$alkylene or $-CH_2CH_2-O-CH_2CH_2-$, either, each of $U_1$ and $U_2$, independently, is hydrogen or $(C_{1-4})$alkyl, and $U_3$ is hydrogen or

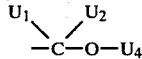

or $U_1$ and $U_2$ together with the carbon atom to which they are bound form a cyclohexyl ring, and $U_3$ is hydrogen, wherein $U_4$ is hydrogen, $(C_{1-4})$alkyl or alkyl$(C_{1-4})$carbonyl.

It will be appreciated that the compounds should not contain substituents or combinations of substituents e.g. on D or K where the latter is substituted 1,4-phenylene, which are known to give rise to steric or stability problems or to deleteriously affect the dyeing properties, for example acetal groupings.

It will be appreciated that the compounds of the invention include two classes of azo dyes, namely monoazo and disazo dyes.

Any unsubstituted alkyl as $U_1$, $U_2$ or $U_4$ is preferably methyl or ethyl, especially methyl.

By halogen, as used herein, is meant chlorine, bromine, fluorine or iodine. The preferred halogens are chlorine and bromine.

Preferably, the diazo component radical D is D' where D' is phenyl which is unsubstituted or substituted by a maximum of up to 4 substituents selected from the group consisting of the chlorine, bromine, iodine (up to 4 of each of these), nitro, cyano, methyl, trifluoromethyl, methoxy, $(C_{1-2})$alkylsulphonyl (maximum of up to 2 of each of these), formyl, aminosulphonyl, alkyl$(C_{1-2})$carbonyl, alkoxy$(C_{1-2})$carbonyl, benzoyl, phenylalkyl$(C_{1-2})$carbonyl, phenoxycarbonyl, phenylsulphonyl, benzylsulphonyl, tolylsulphonyl, thiocyano, $(C_{1-2})$alkyl- or di$(C_{1-2})$alkylaminosulphonyl, $(C_{1-2})$alkoxy-$(C_{2-4})$alkylaminosulphonyl, $(C_{1-2})$alkoxy$(C_{2-4})$alkylaminocarbonyl, and phenylaminosulphonyl, N-$(C_{1-2})$alkyl-N-phenylaminosulphonyl, aminocarbonyl, $(C_{1-2})$alkyl- or di$(C_{1-2})$alkylaminocarbonyl, N-$(C_{1-2})$alkyl-N-phenylaminocarbonyl, phenylaminocarbonyl, phenyl, alkyl$(C_{1-2})$carbonylamino and phenylazo (maximum of 1 of each of these), the benzene nucleus of the phenylazo group being unsubstituted or substituted by up to three substituents selected from the group consisting of chlorine, bromine (maximum of 3 of each), methyl, $(C_{1-2})$alkoxy, cyano and nitro (maximum of 2 of each of these);

thienyl which is unsubstituted or substituted by a total of up to three substituents selected from the group consisting of chlorine, bromine, nitro, cyano, methyl (maximum of 2 of each of these), phenyl, $(C_{1-2})$alkylcarbonyl and $(C_{1-2})$alkoxycarbonyl (maximum of one of each of these);

thiadiazolyl which is unsubstituted or monosubstituted by phenyl, $(C_{1-2})$alkylthio or $(C_{1-2})$alkoxy; a group of the formula

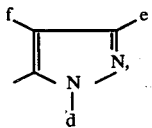

wherein d is hydrogen, $(C_{1-2})$alkyl, cyanoethyl, phenyl, chlorophenyl, or bromophenyl or tolyl, e is $(C_{1-2})$alkyl, $(C_{1-2})$alkoxy, $(C_{1-2})$alkylthio, cyanomethyl, phenyl, alkoxy$(C_{1-4})$carbonyl, aminocarbonyl, $(C_{1-2})$alkylaminocarbonyl, di-$(C_{1-2})$alkylaminocarbonyl or N-$(C_{1-2})$alkyl-N-phenylaminocarbonyl, and f is cyano or alkoxy$(C_{1-2})$carbonyl;

thiazolyl or isothiazolyl which is unsubstituted or substituted by a total of up to 2 substituents selected from the group consisting of chlorine, bromine, nitro, cyano (maximum of 2 of each of these), methyl, thiocyano, aminosulphonyl, $(C_{1-2})$alkylaminosulphonyl, di$(C_{1-2})$alkylaminosulphonyl, phenylaminosulphonyl, N-$(C_{1-2})$alkyl-N-phenylaminosulphonyl and $(C_{1-2})$alkylsulphonyl (maximum of 1 of each of these).

More preferably D is D", where D" is phenyl which is unsubstituted or substituted by a total of up to three substituents selected from the group consisting of chlorine, bromine, iodine, nitro, cyano, methyl, trifluoromethyl, methoxy (maximum of 2 of each of these), $(C_{1-2})$alkylsulphonyl, phenylsulphonyl, tolylsulphonyl, aminosulphonyl, $(C_{1-2})$alkylaminosulphonyl, di$(C_{1-2})$alkylaminosulphonyl, phenylaminosulphonyl, N-$(C_{1-2})$alkyl-N-phenylaminosulphonyl, thiocyano and phenylazo (maximum of 1 of each of these), the benzene nucleus of the phenylazo group being unsubstituted or substituted by a total of up to 3 substituents selected from the group consisting of chlorine, bromine, methyl, methoxy (maximum of 2 of each of these), nitro and cyano (maximum of 1 of each of these);

thienyl which is unsubstituted or substituted by a total of up to 3 substituents selected from the group consisting of chlorine, bromine, nitro, cyano, methyl (maximum of 2 of each of these), phenyl, alkyl($C_{1-2}$)carbonyl and alkoxy($C_{1-2}$)carbonyl (maximum of 1 of each of these);

thiazolyl and isothiazolyl which is unsubstituted or substituted by a total of up to 2 substituents selected from the group consisting of chlorine, bromine (maximum of 1 of each of these), methyl, cyano, nitro, and ($C_{1-2}$)alkylsulphonyl (maximum of 1 of each of these).

Of the given significances for D' and D", the unsubstituted and substituted phenyl radicals are preferred.

Most preferably D is D''', where D''' is phenyl which is unsubstituted or substituted by a total of up to 3 substituents selected from the group consisting of chlorine, bromine, iodine, nitro, cyano (maximum of 2 of each of these), ($C_{1-2}$)alkylsulphonyl and unsubstituted phenylazo (maximum of 1 each of these), the substituted phenyl radicals as D''' being especially preferred.

K is preferably K', where K' is 1,4-naphthylene or a radical of formula IV,

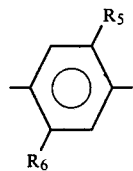

in which
$R_5$ is hydrogen, chlorine; bromine; ($C_{1-2}$)alkyl; ($C_{1-2}$)alkoxy; ($C_{2-4}$)alkoxy monosubstituted by chlorine, bromine, hydroxyl, cyano, ($C_{1-2}$)alkoxy, ($C_{1-2}$) alkoxyethoxy or phenyl; or benzyloxy,
$R_6$ is hydrogen, chlorine, bromine, cyano, ($C_{1-2}$)alkyl, ($C_{1-2}$)alkoxy, formylamino, alkyl($C_{1-4}$)carbonylamino, chloro- or bromoalkyl($C_{1-4}$)carbonylamino, alkoxy($C_{1-2}$)alkyl($C_{1-4}$)carbonylamino, alkoxy($C_{1-2}$)carbonylalkyl($C_{1-2}$)carbonylamino, alkoxy($C_{1-4}$)carbonylamino, phenoxyalkyl($C_{1-2}$)carbonylamino, alkoxy($C_{1-2}$)alkoxy($C_{2-3}$)carbonylamino, alkoxy($C_{1-4}$)carbonylalkyl($C_{1-3}$)aminocarbonylamino, benzoylamino, phenylalkyl($C_{1-2}$)carbonylamino, phenoxycarbonylamino, phenylalkoxy($C_{1-2}$)carbonylamino or ($C_{1-2}$)alkylsulphonylamino, the phenyl ring of any group containing a benzene nucleus being unsubstituted or substituted by a total of up to 2 substituents selected from the group consisting of chlorine, bromine, iodine, ($C_{1-2}$)alkyl (maximum of 2 of each of these) and ($C_{1-2}$)alkoxy (only one thereof).

Preferably, $R_5$ is $R_5'$, where $R_5'$ is hydrogen, ($C_{1-2}$)alkyl or ($C_{1-2}$)alkoxy. More preferably, $R_5$ is $R_5''$, where $R_5''$ is hydrogen or ($C_{1-2}$)alkoxy.

Preferably, $R_6$ is $R_6'$, where $R_6'$ is hydrogen, chlorine, bromine, ($C_{1-2}$)alkyl, ($C_{1-2}$)alkoxy, formylamino, alkyl($C_{1-4}$)carbonylamino, chloro- or bromoalkyl($C_{1-4}$)carbonylamino, alkoxy($C_{1-2}$)alkyl($C_{1-4}$)carbonylamino, phenoxy($C_{1-2}$alkyl)-carbonylamino, alkoxy($C_{1-4}$)carbonylamino, alkoxy($C_{1-2}$)carbonylalkyl($C_{1-2}$)carbonylamino, alkoxy($C_{1-2}$)alkoxy($_{2-3}$)carbonylamino, alkoxy($C_{1-4}$)carbonylalkyl($C_{1-3}$)aminocarbonylamino, benzoylamino, phenylalkyl($C_{1-2}$)carbonylamino, phenoxycarbonylamino, phenylalkoxy($C_{1-2}$)carbonylamino or $C_{1-2}$alkylsulfonylamino. More preferably, $R_6$ is $R_6''$, where $R_6''$ is hydrogen, chlorine, bromine, ($C_{1-2}$)alkyl, ($C_{1-2}$)alkoxy or alkyl($C_{1-2}$)carbonylamino. Most preferably, $R_6$ is $R_6'''$, where $R_6'''$ is hydrogen, methyl or acetylamino.

K is preferably K'', where K'' is 1,4-naphthylene or a radical of formula IV, wherein $R_5$ is $R_5'$ and $R_6$ is $R_6'$. More preferably, K is K''' where K''' is 1,4-naphthylene or a radical of formula IV, where $R_5$ is $R_5''$, and $R_6$ is $R_6''$. Most preferably, K is $K^{IV}$, where $K^{IV}$ is 1,4-naphthylene or a radical of formula IV wherein $R_5$ is ($C_{1-2}$)alkoxy and $R_6$ is $R_6'''$.

$R_1$ is preferably $R_1'$, where $R_1'$, in the case where K is 1,4-naphthylene, is hydrogen or ethyl, and in the case where K is 1,4-phenylene or substituted 1,4-phenylene, is hydrogen, ($C_{1-4}$)alkyl which is unsubstituted or monosubstituted by hydroxy, cyano, ($C_{1-2}$)alkoxy, formyloxy, alkyl($C_{1-3}$)carbonyloxy, benzoyloxy, alkoxy($C_{1-2}$)carbonyloxy or —CO—O—C($U_1U_2$)—C≡C—$U_3$; or ($C_{3-4}$)alkyl substituted by hydroxy and a further substituent selected from the group consisting of chlorine, ($C_{1-2}$)alkoxy, hydroxy, phenoxy and benzyloxy. More preferably, $R_1$ is $R_1''$, where $R_1''$ is hydrogen or ethyl.

$R_2$ is preferably $R_2'$, where $R_2'$ is straight chain ($C_{2-4}$)alkylene, —CH(CH$_3$)—CH$_2$—, —CH$_2$—CH(CH$_3$)— or —CH$_2$CH$_2$—O—CH$_2$CH$_2$—. More preferably $R_2$ is $R_2''$, where $R_2''$ is straight chain ($C_{2-4}$)alkylene, with 1,2-ethylene being especially preferred.

$U_1$ and $U_2$ are preferably $U_1'$ and $U_2'$, where each of $U_1'$ and $U_2'$, independently, is hydrogen or methyl, especially hydrogen.

$U_3$ is preferably $U_3'$, where $U_3'$ is hydrogen, ($C_{1-2}$)alkoxymethyl, ($C_{1-2}$)alkoxy-CH(CH$_3$)—, acetoxymethyl or acetoxy-CH(CH$_3$)—.

Preferred compounds of formula I are those wherein D is D', preferably D'', more preferably D''', K is K', preferably K'', more preferably K''', most preferably $K^{IV}$, $R_1$ is $R_1'$, preferably hydrogen or ethyl, $R_2$ is $R_2'$, preferably straight chain ($C_{2-4}$)alkylene, more preferably 1,2-ethylene, $U_1$ and $U_2$ are $U_1'$ and $U_2'$, preferably hydrogen, and $U_3$ is $U_3'$, (the D's, K's, $R_1$'s $R_2$'s $U_1$'s, $U_2$'s and $U_3$'s being in any combination e.g. D''' with K'', $R_1'$, $R_2$ as ($C_{2-4}$)straight chain alkylene, $U_1'$, $U_2'$ and $U_3'$).

Preferred groups of compounds include (i) those wherein D is D' and K is K', (ii) those wherein D is D''' and K is K', (iii) those wherein D is D' and K is K'', (iv) those wherein D is D', K is K' and $R_1$ is $R_1'$, (v) those of (iv) wherein $R_2$ is $R_2'$, (vi) those of (iv) wherein $U_1$ is $U_1'$, $U_2$ is $U_2'$ and $U_3$ is $U_3'$, (vii) those wherein D is D' aND K is K''', (viii) those of (vii) wherein $R_5$ is hydrogen or ($C_{1-2}$)alkoxy, $R_6$ is $R_6'''$ and $R_2$ is ($C_{2-4}$)alkylene and (ix) those of (vii) wherein $R_1$ is $R_1''$. Also preferred are the compounds of formula I wherein D is phenyl substituted by a maximum of three substituents selected from the group consisting of chlorine, bromine, iodine (up to 3 of each of these), nitro, cyano, methyl, trifluoromethyl, methoxy, ($C_{1-2}$)alkylsulfonyl (maximum of two of each of these), formyl, thiocyano, alkyl($C_{1-2}$)carbonyl, benzylcarbonyl, benzoyl, alkoxy($C_{1-2}$)carbonyl, phenoxycarbonyl, phenylsulfonyl, tolylsulfonyl, aminosulfonyl (sulfamoyl), ($C_{1-2}$)alkyl- or di($C_{1-2}$)alkylaminosulfonyl, ($C_{1-2}$)alkoxy($C_{2-4}$)alkylaminosulfonyl, ($C_{1-2}$)alkoxy($C_{2-4}$)alkylaminocarbonyl, N-($C_{1-2}$)alkyl-N-phenylaminosulfonyl, aminocarbonyl (carbamoyl), ($C_{1-2}$)alkyl- or di($C_{1-2}$)alkylaminocarbonyl, N-($C_{1-2}$)alkyl-N-phenylaminocarbonyl, phenylaminocarbonyl, acetylamino and phenylazo (maximum of 1 of each of these), the benzene nucleus of the phenylazo group being unsubstituted or substituted by up to 3 substituents selected from the group consisting of chlorine, bromine (maximum of 3 of each), methyl, $(C_{1-2})$alkoxy, cyano and nitro (maximum of 2 of each of these); thienyl which is unsubstituted or substituted by a total of up to three substituents selected from the group consisting of chlorine, bromine, nitro, cyano, methyl (maximum of 2 of each of these), $(C_{1-2})$alkylcarbonyl and $(C_{1-2})$alkoxycarbonyl (maximum of one of each of these); thiadiazolyl; phenylthiadiazolyl; thiazolyl or isothiazolyl substituted by a total of up to 2 substituents selected from the group consisting of chlorine, bromine, nitro, cyano (maximum of 2 of each of these), methyl, thiocyano, aminosulfonyl and $(C_{1-2})$alkylsulfonyl (maximum of 1 of each of these) and K is 1,4-naphthylene or a radical of formula IV wherein $R_5$ is hydrogen, chlorine, bromine, $(C_{1-2})$alkyl, $(C_{1-2})$alkoxy or $(C_{2-4})$alkoxy monosubstituted by chlorine, bromine, $(C_{1-2})$alkoxy or phenyl and $R_6$ is hydrogen, chlorine, bromine, cyano, $(C_{1-2})$alkyl, $(C_{1-2})$alkoxy, formylamino (formamido) or alkyl$(C_{1-3})$carbonylamino.

The present invention also provides a process for the production of compounds of formula I comprising coupling the diazonium derivative of an amine of formula II,

D—NH$_2$      II with a compound of formula III,

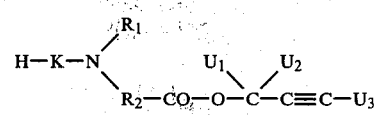

III

The coupling and diazotization reactions may be carried out in accordance with conventional methods.

The coupling components may be prepared in accordance with known methods, for example by reacting an ester of formula IX,

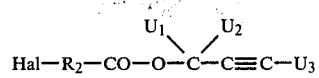

XV wherein Hal is chlorine or bromine, with a compound of formula VII,

H—K—NHR$_1$      VII in the presence of an acid binding agent.

The ester of formula XV may be conveniently prepared by condensing a compound of formula XVI,

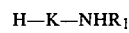

XVI wherein Hal is chlorine or bromine or preferably the acid chloride or bromide, thereof, with an alcohol of formula XVII

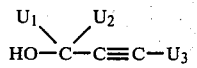

XVII

The compounds of formulae XVI and XVII are known or may be prepared in accordance with known methods.

The compounds of formula I are useful as disperse dyes for dyeing or printing textile substrates comprising synthetic and semi-synthetic, high-molecular weight, hydrophobic organic materials from aqueous suspensions. Preferred substrates are textiles comprising linear, aromatic polyesters, cellulose, 2½ acetate, cellulose triacetate or synthetic polyamides.

The compounds are made up into dyeing preparations in accordance with conventional methods, for example by grinding in the presence of dispersing agents and/or fillers, with or without vacuum or spray drying.

Dyeing may be carried out in accordance with known methods, for example as described in French Pat. No. 1,445,371.

The dyeings obtained have notable fastnesses, in particular light-, thermofixation-, sublimation-, pressing- and wet-fastness.

It is sometimes the case that the dyestuffs are obtained in the thermounstable form and can be converted to the thermostable form by known methods, e.g. recrystallization or grinding, etc.

The following examples further serve to illustrate the invention. In the examples the parts are parts by weight and the temperatures are in degrees Centigrade.

EXAMPLE 1

Preparation of the dye of the formula

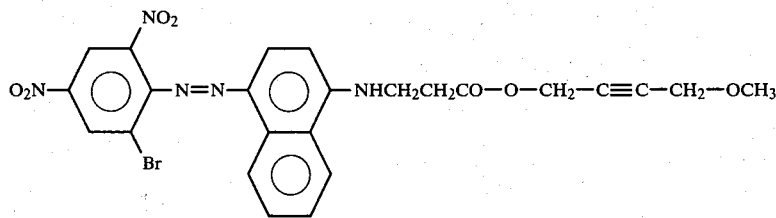

8 Parts crystallized sodium nitrite are added slowly, with stirring, to 147 parts concentrated sulphuric acid. The solution is cooled to 10 to 20°, 10 parts glacial acetic acid are added thereto and after further cooling to 0–5° 26 parts of 2-bromo-4,6-dinitroaniline are added thereto. 10 further parts glacial acetic acid are added and the reaction mixture is stirred for 3 hours at 0–5° C., the excess nitrosylsulphuric acid being taken up by urea.

The diazonium salt solution is added, with stirring, to a coupling solution of 56.4 parts N-[4'-methoxybut-2'-ynyloxycarbonylethyl]-α-naphthylamine in 100 parts glacial acetic acid cooled to 0–5°. After coupling is complete the dyestuff obtained is precipitated by the addition of 100 parts sodium acetate and 500 parts ice-water, filtered and washed free of acid. Subsequently, the dyestuff is added to 100 parts water, stirred for 3 hours at 90°, filtered again, washed with water and dried.

The product obtained dyes polyester fibre in blue shades.

The above-mentioned coupling component may be prepared as follows:

Over a period of 15 minutes, 7 parts anhydrous acrylic acid are added to a mixture of 14.3 parts α-naphthylamine and 20 parts 4-methoxybut-2-ynol at 85°. The temperature is then raised to 95° and the mixture is stirred for 15 hours at this temperature. After cooling to room temperature, 6 parts para-toluenesulphonic acid and 60 parts toluene are added. The mixture is then heated to boiling point whereby the azeotrope of toluene and water is distilled off. After the reaction is complete, the mixture is cooled, washed with a dilute solution of sodium carbonate, then with water and the organic phase is separated and freed of toluene, whereby the N-[4'-methoxybut-2-ynyloxycarbonylethyl]-α-naphthylamine is obtained.

EXAMPLES 2-4

Proceeding in accordance with the process described in example 1 but employing, instead of the N-(4'-methoxybut-2'-ynyloxycarbonylethyl)-α-naphthylamine, an equivalent amount of the following listed coupling components, a dyestuff with similar dyeing properties and shades is obtained:

2. 5-Acetylamino-2-ethoxy-N-(prop-2'-ynyloxycarbonylethyl)-aniline.
3. 5-Acetylamino-2-ethoxy-N-(4'-methoxybut-2'-ynyloxycarbonylethyl)-aniline.
4. 5-Acetylamino-2-methoxy-N-(4'-ethoxybut-2'-ynyloxycarbonylethyl)-aniline.

EXAMPLES 5-12

In place of 2-bromo-4,6-dinitroaniline used in examples 1-4 an equivalent amount of 2-chloro-4,6-dinitroaniline or 2-iodo-4,6-dinitroaniline is employed to form dyestuffs in accordance with the procedure described in example 1. The dyestuffs obtained also dye polyester fibres in navy-blue shades.

EXAMPLES 13-19

In analogy with the procedure given in example 1, diazotised 2-chloro-4-nitroaniline is coupled with the following listed coupling components. The dyestuffs obtained give dyeings of red shades on polyester as that of example 1.

13. 3-Acetylamino-N-β-cyanoethyl-N-(prop-2'-ynyloxycarbonylethyl)-aniline.
14. 3-Acetylamino-N,N-di-(prop-2'-ynyloxycarbonylethyl)-aniline.
15. 3-Acetylamino-N,N-di-(4'-methoxybut-2'-ynyloxycarbonylethyl)-aniline.
16. N,N-di-(prop-2'-ynyloxycarbonylethyl)-aniline.
17. N-β-cyanoethyl-N-(prop-2'-ynyloxycarbonylethyl)-aniline.
18. N-β-hydroxyethyl-N-(prop-2'-ynyloxycarbonylethyl)-aniline.
19. N-ethyl-N-(prop-2'-ynyloxycarbonylethyl)-aniline.

EXAMPLES 20-26

In accordance with the procedure described in example 1, diazotised 2-cyano-4-nitroaniline is coupled with the components of examples 13-19. The dyestuffs obtained dye polyester fibres in red to violet shades.

EXAMPLES 27-33

In accordance with the procedure described in example 1, but employing 4-nitroaniline instead of 2-bromo-4,6-dinitroaniline and coupling with the coupling components of examples 13-19, dyestuffs are obtained which dye polyester fibres in yellowish-red to red shades.

EXAMPLE 34

In analogy with the procedure described in example 1, diazotised 2-bromo-4,6-dinitroaniline is coupled with N-(prop-2'-ynyloxycarbonylethyl)-α-naphthylamine. A dyestuff which dyes polyester fibres in reddish-blue shades is obtained.

EXAMPLES 35-43

Proceeding in accordance with the process described in example 1 but employing, instead of 2-bromo-4,6-dinitroaniline, an equivalent amount of the following listed diazo components, dyestuffs having similar properties which dye polyester fibres in blue shades are obtained:

2-cyano-4-nitro-6-bromoaniline
2,4-dinitro-6-cyanoaniline
2,4-dinitro-6-methylsulphonylaniline
2,4-dinitro-6-ethylsulphonylaniline
2,6-dicyano-4-nitroaniline
2-cyano-4-nitro-6-methylsulphonylaniline
2-cyano-4-nitro-6-chloro- or iodo-aniline
2,5,-dichloro-4,6-dinitroaniline.

EXAMPLES 44-51

Proceeding in accordance with the process described in example 1 but employing a coupling component of the formula

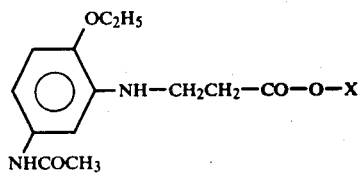

wherein X is:

-CH₂C≡CH
-CH₂C≡C—CH₂OCH₃
-CH₂C≡C—CH₂OC₂H₅
-CH₂C≡C—CH₂OCOCH₃
-C(CH₃)₂—C≡CH
-C(C₂H₅)₂—C≡CH
-CH(CH₃)—C≡C—CH(CH₃)—OCH₃ and

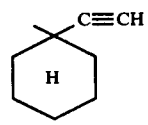

in place of the N-[4'-methoxybut-2'-ynyloxycarbonylethyl]-α-naphthylamine, dyestuffs which dye polyester fibres in blue shades are obtained.

In the following table further dyestuffs which may be prepared in analogy with the procedure described in example 1 are given. The dyes correspond to the formula

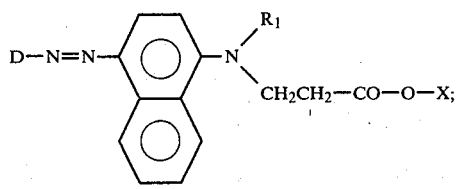

the significances of D, $R_1$ and X as well as the dye shades on polyester fibre are given in the table.

Table

| Example No. | D | $R_1$ | X | Shade |
|---|---|---|---|---|
| 52 | 2,4-dinitro-6-bromophenyl | H | —CH$_2$—C≡CH | reddish blue |
| 53 | " | " | —CH$_2$—C≡C—CH$_2$OCOCH$_3$ | " |
| 54 | 2,4-dinitro-6-chlorophenyl | —C$_2$H$_5$ | —CH$_2$C≡CH | " |
| 55 | " | " | —CH$_2$—C≡C—CH$_2$OCH$_3$ | " |
| 56 | " | " | —CH$_2$—C≡C—CH$_2$OCOCH$_3$ | " |
| 57 | 2,4-dinitro-6-cyanophenyl | H | —CH$_2$—C≡CH | blue |
| 58 | " | " | —CH$_2$—C≡C—CH$_2$OCOCH$_3$ | " |
| 59 | 2,6-dicyano-4-nitrophenyl | H | —CH$_2$—C≡CH | " |
| 60 | " | " | —CH$_2$—C≡C—CH$_2$OCH$_3$ | " |
| 71 | " | " | —CH$_2$—C≡C—CH$_2$O—COCH$_3$ | " |
| 72 | 2-cyano-4-nitro-6-bromophenyl | nC$_4$H$_9$ | —CH$_2$—C≡CH | reddish blue |
| 73 | " | " | —CH$_2$—C≡C—CH$_2$OCH$_3$ | " |
| 74 | " | " | —CH$_2$—C≡C—CH$_2$OCOCH$_3$ | |

APPLICATION EXAMPLE A

7 Parts of the dyestuff of example 1 are ground to a fine powder in a ball mill for 48 hours with 4 parts sodium dinaphthylmethanedisulphonate, 4 parts sodium ethylsulphate and 5 parts anhydrous sodium sulphate.

1 Part of the dyestuff preparation obtained is mixed with a little water and the suspension is added through a sieve to a dyebath containing 2 parts sodium laurylsulphate in 4000 parts water. 100 parts of scoured polyester material are added to the bath at 40°–50° C. (liquor ratio 1:40), 20 parts of chlorobenzene are added thereto, the bath is slowly heated to 100° C. and dyeing is effected from 1 to 2 hours at 95°–100° C. The dyed substrate is washed, soaped, washed again and dried. The deep blue equal dyeing possesses notable light-, wash-, sublimation-, thermofixation- and permanent press fastness.

The compounds of Examples 2 to 66 may also be employed to dye polyester in analogous manner.

What we claim is:

1. A compound of the formula

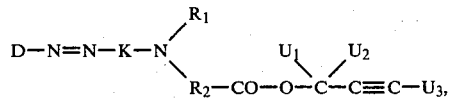

wherein
D is a diazo component radical of the benzene, pyrazole, thiophene, thiazole, isothiazole or thiadiazole series,
K is 1,4-phenylene, substituted 1,4-phenylene or 1,4-naphthylene,
$R_1$ is hydrogen; $C_{1-4}$alkyl; $C_{1-4}$alkyl monosubstituted by chloro, bromo, vinylsulfonyl, hydroxy, cyano, $C_{1-2}$alkoxy, phenyl, acetyl, phenoxy, formyloxy, ($C_{1-3}$alkyl)carbonyloxy, benzoyloxy, ($C_{1-2}$alkoxy)carbonyl, ($C_{1-2}$alkoxy)carbonyloxy, ($C_{1-2}$alkyl)carbamoyl, di-($C_{1-2}$alkyl)carbamoyl or $$-CO-O-\underset{U_1}{\overset{U_2}{C}}-C\equiv C-U_3;$$

$C_{3-4}$alkyl substituted by hydroxy and one further substituent selected from the group consisting of chloro, $C_{1-4}$alkoxy, hydroxy, phenoxy and benzyloxy; $C_{2-4}$alkenyl; $C_{3-4}$chloroalkenyl or $C_{3-4}$bromoalkenyl, with the proviso that $R_1$ must be hydrogen or $C_{1-4}$alkyl when K is 1,4-naphthylene,
wherein $U_1$, $U_2$ and $U_3$ are as defined below,
$R_2$ is straight or branched chain $C_{1-4}$alkylene or —CH$_2$CH$_2$—O—CH$_2$CH$_2$—,
Each of $U_1$ and $U_2$ is independently hydrogen or $C_{1-4}$alkyl or $U_1$ and $U_2$ taken together and with the carbon atom to which they are joined form a cyclohexyl ring, and
$U_3$ is hydrogen or $$-\underset{U_1}{\overset{U_2}{C}}-O-U_4,$$

wherein $U_1$ and $U_2$ are as defined above, and $U_4$ is hydrogen, $C_{1-4}$alkyl or ($C_{1-4}$alkyl)carbonyl, with the proviso that when $U_1$ and $U_2$ taken together and with the carbon atom to which they are joined form a cyclohexyl ring, any —C≡C—$U_3$ group attached to the carbon atom to which said $U_1$ and $U_2$ are joined must be —C≡C—H,
with the proviso that the molecule is free of acetal groups.

2. A compound according to claim 1 having the formula

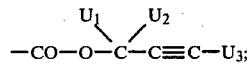

wherein
D' is phenyl; substituted phenyl having 1 to 4 substituents each of which is independently chloro, bromo, iodo, nitro (maximum of two), cyano (maximum of two), methyl (maximum of two), trifluoromethyl (maximum of two), methoxy (maximum of two), $C_{1-2}$alkylsulfonyl (maximum of two), formyl (maximum of one), sulfamoyl (maximum of one), ($C_{1-2}$alkyl)carbonyl (maximum of one), ($C_{1-2}$alkoxy)carbonyl (maximum of one), benzoyl (maximum of one), phenyl($C_{1-2}$alkyl)carbonyl (maximum of one), phenoxycarbonyl (maximum of one), phenylsulfonyl (maximum of one), benzylsulfonyl (maximum of one), tolylsulfonyl (maximum of one), thiocyano (maximum of one), $C_{1-2}$alkylsulfamoyl (maximum of one), di-($C_{1-2}$alkyl)sulfamoyl (maximum of one), ($C_{1-2}$alkoxy)$C_{2-4}$alkylsulfamoyl (maximum of one), ($C_{1-2}$alkoxy)($C_{2-4}$alkyl)carbamoyl (maximum of one), phenylsulfamoyl (maximum of one), N-$C_{1-2}$alkyl-N-phenylsulfamoyl (maximum of one), carbamoyl (maximum of one), ($C_{1-2}$alkyl)carbamoyl (maximum of one), di($C_{1-2}$alkyl)carbamoyl (maximum of one), N-$C_{1-2}$alkyl-N-phenylcarbamoyl (maximum of one), phenylcarbamoyl (maximum of one), phenyl (maximum of one), ($C_{1-2}$alkyl)carbonylamino (maximum of one), phenylazo or substituted phenylazo having 1 to 3 substituents each of which is independently chloro, bromo, methyl (maximum of two), $C_{1-2}$alkoxy (maximum of two), cyano (maximum of two) or nitro (maximum of two) (maximum number of phenylazo and substituted phenylazo together is one); thienyl; substituted thienyl having 1 to 3 substituents each of which is independently chloro (maximum of two), bromo (maximum of two), nitro (maximum of two), cyano (maximum of two), methyl (maximum of two), phenyl (maximum of one), ($C_{1-2}$alkyl)carbonyl (maximum of one) or ($C_{1-2}$alkoxy)carbonyl (maximum of one); thiadiazolyl; thiadiazolyl monosubstituted by phenyl, $C_{1-2}$alkylthio or $C_{1-2}$alkoxy; thiazolyl; substituted thiazolyl having 1 or 2 substituents each of which is independently chloro, bromo, nitro, cyano, methyl (maximum of one), thiocyano (maximum of one), sulfamoyl (maximum of one), $C_{1-2}$alkylsulfamoyl (maximum of one), di-($C_{1-2}$alkyl)sulfamoyl (maximum of one), phenylsulfamoyl (maximum of one), N-$C_{1-2}$alkyl-N-phenylsulfamoyl (maximum of one) or $C_{1-2}$alkylsulfonyl (maximum of one); isothiazolyl; substituted isothiazolyl having 1 or 2 substituents each of which is independently chloro, bromo, nitro, cyano, methyl (maximum of one), thiocyano (maximum of one), sulfamoyl (maximum of one), $C_{1-2}$alkylsulfamoyl (maximum of one), di-($C_{1-2}$alkyl)sulfamoyl (maximum of one), phenylsulfamoyl (maximum of one), N-$C_{1-2}$-alkyl-N-phenylsulfamoyl (maximum of one) or $C_{1-2}$-alkylsulfonyl (maximum of one); or

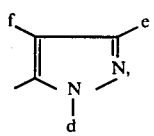

wherein
d is hydrogen, $C_{1-2}$alkyl, cyanoethyl, phenyl, chlorophenyl, bromophenyl or tolyl,
e is $C_{1-2}$alkyl, $C_{1-2}$alkoxy, $C_{1-2}$alkylthio, cyanomethyl, phenyl, ($C_{1-4}$alkoxy)carbonyl, carbamoyl, ($C_{1-2}$alkyl)carbamoyl, di($C_{1-2}$alkyl)carbamoyl or N-$C_{1-2}$alkyl-N-phenylcarbamoyl, and
f is cyano or ($C_{1-2}$alkoxy)carbonyl,
K' is

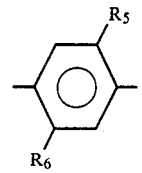

or 1,4-naphthylene,
wherein
$R_5$ is hydrogen; chloro; bromo; $C_{1-2}$alkyl; $C_{1-2}$alkoxy; $C_{2-4}$alkoxy monosubstituted by chloro, bromo, hydroxy, cyano, $C_{1-2}$alkoxy, ($C_{1-2}$alkoxy)ethoxy or phenyl; or benzyloxy, and
$R_6$ is hydrogen, chloro, bromo, cyano, $C_{1-2}$alkyl, $C_{1-2}$alkoxy, formamido, ($C_{1-4}$alkyl)carbonylamino, ($C_{1-4}$chloroalkyl)carbonylamino, ($C_{1-4}$bromoalkyl)carbonylamino, ($C_{1-2}$alkoxy)($C_{1-4}$alkyl)carbonylamino, ($C_{1-2}$alkoxy)carbonyl($C_{1-2}$alkyl)carbonylamino, phenoxy($C_{1-2}$alkyl)carbonylamino, (substituted phenoxy) ($C_{1-2}$alkyl)carbonylamino, phenyl($C_{1-2}$alkyl)carbonylamino, (substituted phenyl)($C_{1-2}$alkyl)carbonylamino, ($C_{1-4}$alkoxy)carbonylamino, ($C_{1-2}$alkoxy)($C_{2-3}$alkoxy)carbonylamino, phenyl($C_{1-2}$alkoxy)carbonylamino, (substituted phenyl) ($C_{1-2}$alkoxy)carbonylamino, ($C_{1-4}$alkoxy)carbonyl($C_{1-3}$alkyl)aminocarbonylamino, benzamido, (substituted phenyl)carbonylamino, phenoxycarbonylamino, (substituted phenoxy)carbonylamino or $C_{1-2}$alkylsulfonylamino, wherein each substituted phenyl and substituted phenoxy moiety is substituted by 1 or 2 substituents each of which is independently chloro, bromo, iodo, $C_{1-2}$alkyl or $C_{1-2}$alkoxy (maximum of one $C_{1-2}$alkoxy),
$R_1$ is hydrogen; $C_{1-4}$alkyl; $C_{1-4}$alkyl monosubstituted by chloro, bromo, vinylsulfonyl, hydroxy, cyano, $C_{1-2}$alkoxy, phenyl, acetyl, phenoxy, formyloxy, ($C_{1-3}$alkyl)carbonyloxy, benzoyloxy, ($C_{1-2}$alkoxy)carbonyl, ($C_{1-2}$alkoxy)carbonyloxy, ($C_{1-2}$alkyl)carbamoyl, di-($C_{1-2}$alkyl)carbamoyl or

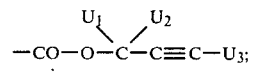

$C_{3-4}$alkyl substituted by hydroxy and one further substituent selected from the group consisting of chloro, $C_{1-4}$alkoxy, hydroxy, phenoxy and benzyloxy; $C_{2-4}$alkenyl; $C_{3-4}$chloroalkenyl or $C_{3-4}$bromoalkenyl, with the proviso that $R_1$ must be hydrogen or $C_{1-4}$alkyl when K' is 1,4-naphthylene, wherein $U_1$, $U_2$ and $U_3$ are as defined below,
$R_2$ is straight or branched chain $C_{1-4}$alkylene or —$CH_2CH_2$—O—$CH_2CH_2$—,
each of $U_1$ and $U_2$ is independently hydrogen or $C_{1-4}$alkyl or $U_1$ and $U_2$ taken together and with the carbon atom to which they are joined form a cyclohexyl ring, and
$U_3$ is hydrogen or

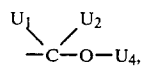

wherein $U_1$ and $U_2$ are as defined above, and $U_4$ is hydrogen, $C_{1-4}$alkyl or ($C_{1-4}$alkyl)carbonyl, with the proviso that when $U_1$ and $U_2$ taken together and with the carbon atom to which they are joined form a cyclohexyl ring, any $-C\equiv C-U_3$ group attached to the carbon atom to which said $U_1$ and $U_2$ are joined must be $-C\equiv C-H$, with the proviso that the molecule is free of acetal groups.

3. A compound according to claim 2 wherein D' is phenyl; substituted phenyl having 1 to 3 substituents each of which is independently chloro (maximum of two), bromo (maximum of two), iodo (maximum of two), nitro (maximum of two), cyano (maximum of two), methyl (maximum of two), trifluoromethyl (maximum of two), methoxy (maximum of two), $C_{1-2}$alkylsulfonyl (maximum of one), phenylsulfonyl (maximum of one), tolylsulfonyl (maximum of one), sulfamoyl (maximum of one), $C_{1-2}$alkylsulfamoyl (maximum of one), di-($C_{1-2}$alkyl)sulfamoyl (maximum of one), phenylsulfamoyl (maximum of one), N-$C_{1-2}$alkyl-N-phenylsulfamoyl (maximum of one), thiocyano (maximum of one), phenylazo or substituted phenylazo having 1 to 3 substituents each of which is independently chloro (maximum of two), bromo (maximum of two), methyl (maximum of two), methoxy (maximum of two), cyano (maximum of one) or nitro (maximum of one) (maximum number of phenylazo and substituted phenylazo together is one); thienyl; substituted thienyl having 1 to 3 substituents each of which is independently chloro (maximum of two), bromo (maximum of two), nitro (maximum of two), cyano (maximum of two), methyl (maximum of two), phenyl (maximum of one), ($C_{1-2}$alkyl)carbonyl (maximum of one) or ($C_{1-2}$alkoxy)carbonyl (maximum of one); thiazolyl; substituted thiazolyl having 1 or 2 substituents each of which is independently chloro, bromo, nitro, cyano, methyl or $C_{1-2}$alkylsulfonyl (maximum of one of each); isothiazolyl or substituted isothiazolyl having 1 or 2 substituents each of which is independently chloro, bromo, nitro, cyano, methyl or $C_{1-2}$alkylsulfonyl (maximum of one of each).

4. A compound according to claim 2 wherein D' is substituted phenyl having 1 to 3 substituents each of which is independently chloro, bromo, iodo, nitro (maximum of two), cyano (maximum of two), methyl (maximum of two), trifluoromethyl (maximum of two), methoxy (maximum of two), $C_{1-2}$alkylsulfonyl (maximum of two), formyl (maximum of one), thiocyano (maximum of one), ($C_{1-2}$alkyl)carbonyl (maximum of one), ($C_{1-2}$alkoxy)carbonyl (maximum of one), benzoyl (maximum of one), benzylcarbonyl (maximum of one), phenoxycarbonyl (maximum of one), phenylsulfonyl (maximum of one), tolylsulfonyl (maximum of one), sulfamoyl (maximum of one), $C_{1-2}$alkylsulfamoyl (maximum of one), di-($C_{1-2}$alkyl)sulfamoyl (maximum of one), ($C_{1-2}$alkoxy)$C_{2-4}$alkylsulfamoyl (maximum of one), ($C_{1-2}$alkoxy)($C_{2-4}$alkyl)carbamoyl (maximum of one), N-$C_{1-2}$alkyl-N-phenylsulfamoyl (maximum of one), carbamoyl (maximum of one), ($C_{1-2}$alkyl)carbamoyl (maximum of one), di-($C_{1-2}$alkyl)carbonyl (maximum of one), N-$C_{1-2}$alkyl-N-phenylcarbamoyl (maximum of one), phenylcarbamoyl (maximum of one), acetamido (maximum of one), phenylazo or substituted phenylazo having 1 to 3 substituents each of which is independently chloro, bromo, methyl (maximum of two), $C_{1-2}$alkoxy (maximum of two), cyano (maximum of two) or nitro (maximum of two) (maximum number of phenylazo and substituted phenylazo together is one); thienyl; substituted thienyl having 1 to 3 substituents each of which is independently chloro (maximum of two), bromo (maximum of two), nitro (maximum of two), cyano (maximum of two), methyl (maximum of two), ($C_{1-2}$alkyl)carbonyl (maximum of one) or ($C_{1-2}$alkoxy)carbonyl (maximum of one); thiadiazolyl; phenylthiadiazolyl; substituted thiazolyl having 1 or 2 substituents each of which is independently chloro, bromo, nitro, cyano, methyl (maximum of one), thiocyano (maximum of one), sulfamoyl (maximum of one) or $C_{1-2}$alkylsulfonyl (maximum of one); or substituted isothiazolyl having 1 or 2 substituents each of which is independently chloro, bromo, nitro, cyano, methyl (maximum of one), thiocyano (maximum of one), sulfamoyl (maximum of one) or $C_{1-2}$alkylsulfonyl (maximum of one), $R_5$ is hydrogen, chloro, bromo, $C_{1-2}$alkyl, $C_{1-2}$alkoxy or $C_{2-4}$alkoxy monosubstituted by chloro, bromo, $C_{1-2}$alkoxy or phenyl, and $R_6$ is hydrogen, chloro, bromo, cyano, $C_{1-2}$alkyl, $C_{1-2}$alkoxy, formamido or ($C_{1-3}$alkyl)carbonylamino.

5. A compound according to claim 2 wherein D' is phenyl or substituted phenyl having 1 to 3 substituents each of which is independently chloro (maximum of two), bromo (maximum of two), iodo (maximum of two), nitro (maximum of two), cyano (maximum of two), $C_{1-2}$alkylsulfonyl (maximum of one) or phenylazo (maximum of one).

6. A compound according to claim 2 wherein $R_5$ is hydrogen, $C_{1-2}$alkyl or $C_{1-2}$alkoxy, and
$R_6$ is hydrogen, chloro, bromo, $C_{1-2}$alkyl, $C_{1-2}$alkoxy, formamido, ($C_{1-4}$alkyl)carbonylamino, ($C_{1-4}$chloroalkyl)carbonylamino, ($C_{1-4}$bromoalkyl)carbonylamino, ($C_{1-2}$alkoxy) ($C_{1-4}$alkyl)carbonylamino, phenoxy($C_{1-2}$alkyl)carbonylamino, phenyl($C_{1-2}$alkyl)carbonylamino, ($C_{1-2}$alkoxy)carbonyl($C_{1-2}$alkyl)carbonylamino, ($C_{1-4}$alkoxy)carbonylamino, ($C_{1-2}$alkoxy) ($C_{2-3}$alkoxy)carbonylamino, phenyl($C_{1-2}$alkoxy)carbonylamino, ($C_{1-4}$alkoxy)carbonyl($C_{1-3}$alkyl)aminocarbonylamino, benzamido, $C_{1-2}$alkylsulfonylamino or phenoxycarbonylamino.

7. A compound according to claim 6 wherein $R_6$ is hydrogen, chloro, bromo, $C_{1-2}$alkyl, $C_{1-2}$alkoxy, formamido, ($C_{1-4}$alkyl)carbonylamino, ($C_{1-4}$chloroalkyl)carbonylamino, ($C_{1-4}$bromoalkyl)carbonylamino, ($C_{1-2}$alkoxy) ($C_{1-4}$alkyl)carbonylamino, phenoxy($C_{1-2}$alkyl)carbonylamino, phenyl($C_{1-2}$alkyl)carbonylamino, ($C_{1-2}$alkoxy)carbonyl($C_{1-2}$alkyl)carbonylamino, ($C_{1-4}$alkoxy)carbonylamino, ($C_{1-2}$alkoxy) ($C_{2-3}$alkoxy)carbonylamino, ($C_{1-4}$alkoxy)carbonyl($C_{1-3}$alkyl)aminocarbonylamino, benzamido or $C_{1-2}$alkylsulfonylamino.

8. A compound according to claim 7 wherein $R_5$ is hydrogen or $C_{1-2}$alkoxy, and
$R_6$ is hydrogen, chloro, bromo, $C_{1-2}$alkyl, $C_{1-2}$alkoxy or ($C_{1-2}$alkyl)carbonylamino.

9. A compound according to claim 8 wherein $R_2$ is $C_{2-4}$alkylene, and
$R_6$ is hydrogen, methyl or acetamido.

10. A compound according to claim 8 wherein $R_1$ is hydrogen or ethyl.

11. A compound according to claim 2 wherein $R_1$ is hydrogen; $C_{1-4}$alkyl; $C_{1-4}$alkyl monosubstituted by hydroxy, cyano, $C_{1-2}$alkoxy, formyloxy, ($C_{1-3}$alkyl)carbonyloxy, benzoyloxy, ($C_{1-2}$alkoxy)carbonyloxy or

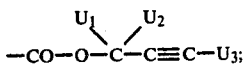

or C$_{3-4}$alkyl substituted by hydroxy and one further substituent selected from the group consisting of chloro, C$_{1-2}$alkoxy, hydroxy, phenoxy and benzyloxy, with the proviso that R$_1$ must be hydrogen or ethyl when K' is 1,4-naphthylene.

12. A compound according to claim 11 wherein R$_2$ is straight chain C$_{2-4}$alkylene, —CH(CH$_3$)—CH$_2$—, —CH$_2$—CH(CH$_3$)— or —CH$_2$CH$_2$—O—CH$_2$CH$_2$—.

13. A compound according to claim 11 wherein each of U$_1$ and U$_2$ is independently hydrogen or methyl, and U$_3$ is hydrogen, (C$_{1-2}$alkoxy)methyl, 1-(C$_{1-2}$alkoxy)ethyl, acetoxymethyl or 1-acetoxyethyl.

14. The compound according to claim 13, having the formula

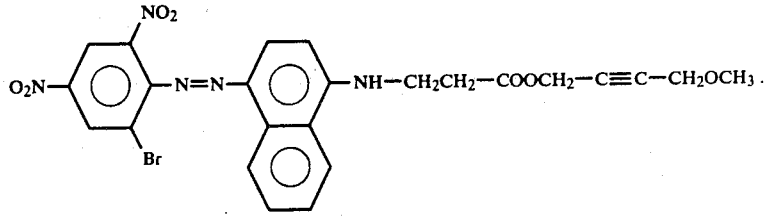

15. The compound according to claim 13 having the formula

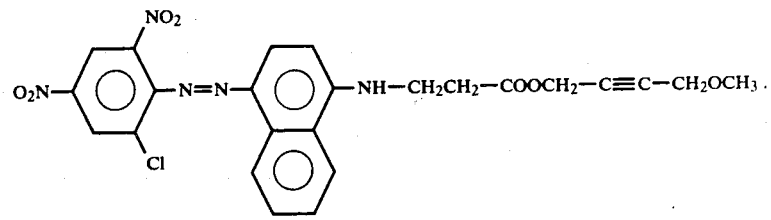

* * * * *